United States Patent [19]
Imade et al.

[11] Patent Number: 5,192,839
[45] Date of Patent: Mar. 9, 1993

[54] ACCELERATION SENSOR

[75] Inventors: Noritoshi Imade, Fujisawa; Katsuyasu Ono, Chigasaki, both of Japan

[73] Assignee: NSK Ltd., Tokyo, Japan

[21] Appl. No.: 811,225

[22] Filed: Dec. 20, 1991

[30] Foreign Application Priority Data

Dec. 26, 1990 [JP] Japan .................. 2-404876[U]

[51] Int. Cl.$^5$ .......................................... H01M 35/14
[52] U.S. Cl. ................... 200/61.45 R; 200/61.45 M; 200/61.5
[58] Field of Search ............... 200/61.45 R, 61.45 M, 200/61.5, DIG. 29; 335/205–207

[56] References Cited

U.S. PATENT DOCUMENTS

| | | | |
|---|---|---|---|
| 2,892,049 | 6/1959 | Rubinstein | 200/DIG. 29 X |
| 2,898,415 | 8/1959 | Clurman | 200/61.45 R |
| 3,569,643 | 3/1971 | Clarke et al. | 200/61.53 |
| 3,748,415 | 7/1973 | Suzuki | 200/61.45 M |
| 3,798,399 | 3/1974 | Corporandy | 200/61.45 R |
| 3,916,127 | 10/1975 | Roesch et al. | 200/61.45 R |
| 3,927,286 | 12/1976 | Fohl | 200/61.45 R |
| 4,071,723 | 1/1978 | Jackman | 200/61.45 R |
| 4,178,492 | 12/1979 | Roesch et al. | 200/61.45 R |
| 4,185,507 | 1/1980 | Domyan | 200/61.45 R X |
| 4,326,111 | 4/1982 | Jackman | 200/61.45 R |
| 4,533,801 | 8/1985 | Jackman et al. | 200/61.45 R |

FOREIGN PATENT DOCUMENTS 49-22562 2/1974 Japan .
60-50293 11/1985 Japan .

Primary Examiner—J. R. Scott
Attorney, Agent, or Firm—Wegner, Cantor, Mueller & Player

[57] ABSTRACT

An acceleration sensor is constructed of a spherical inertia element made of a magnetic material and having a predetermined mass, an annular magnet defining a retainer hole on which the inertia element is allowed to rest and is retained until a predetermined acceleration is applied thereto, a switch change-over member for changing over a switch in response to movement of the inertia element from the retainer hole onto an upper wall of the magnet upon application of the predetermined acceleration, a rod slidably inserted in the retainer hole, and a coil spring biasing the rod toward the inertia element. When the inertia element has jumped out from the retainer hole onto an upper wall of the magnet, the rod is caused to move upward by the biasing force of the coil spring so that a free end portion of the rod closes the retainer hole.

12 Claims, 5 Drawing Sheets

ACCELERATION SENSOR

BACKGROUND OF THE INVENTION

This invention relates to an acceleration sensor for detecting the action of acceleration and/or deceleration (hereinafter collectively referred to as "acceleration") in a vehicle. For example, such an acceleration sensor is usable for controlling a passive seat belt system in which a webbing is secured at one end thereof on a retractor mounted on a floor and is movable back and forth at the other end thereof along a roof rail in response to the closure and opening of an associated door. The acceleration sensor is also usable for the control of a fuel pump or the like. When the acceleration sensor detects an acceleration, for example, in the event of a vehicular collision, it serves to prevent the other end of the webbing from moving forward along the roof rail even when the door opens and/or to stop the operation of the fuel pump.

Conventional acceleration sensors includes that disclosed in Japanese Patent Publication No. SHO 51-20704. This conventional acceleration sensor is equipped with a spherical inertia element, which is made of a magnetic material and having a predetermined mass, and a plate-like magnet for attracting the inertia element. The inertia element is retained by magnetic force at a first end on an upper wall of the magnet but, when a predetermined acceleration is applied, the inertia element is caused to move to a second end on the upper wall of the magnet so that a switch is turned on. The inertia element is allowed to remain at the second end by magnetic force.

The conventional acceleration sensor described above is, however, accompanied by the problem that, if the inertia element is caused to move to another position by a secondary collision or the like, the switch is turned off and a signal indicating a collision can no longer be continuously outputted.

SUMMARY OF THE INVENTION

With the foregoing in view, the present invention has as a primary object thereof the provision of acceleration sensor in which, once a switch is turned on by movement of an inertia element from a predetermined position as a result of application of an acceleration, the inertia element is prohibited from returning to the original position and the switch is hence not turned off even when subjected to a secondary collision.

In one aspect of this invention, there is thus provided an acceleration sensor which comprises:

a spherical inertia element having a predetermined mass;

a plate-like member defining a retainer hole on which the inertia element is allowed to rest and is retained until a predetermined acceleration is applied to the inertia element;

a switch change-over member for changing over a switch in response to movement of the inertia element from the retainer hole to an upper wall of the plate-like member upon application of the predetermined acceleration;

a rod slidably inserted in the retainer hole: and a biasing member for biasing the rod toward the inertia element resting on the retainer hole;

whereby, when the inertia element has moved from the retainer hole to the upper wall of the plate-like member, the rod is caused to move under the biasing force of the biasing member and the retainer hole is closed by a free end portion of the rod.

When the inertia element jumps out onto the upper surface of the plate-like member from the retainer hole, the switch change-over member changes over the switch and the free end portion of the rod closes the retainer hole under the biasing force of the biasing member, both in response to the movement of the inertia element.

In another aspect of this invention, there is also provided an acceleration sensor which comprises:

a spherical inertia element having a predetermined mass;

a plate-like member defining a retainer hole on which the inertia element is allowed to rest and is retained until a predetermined acceleration is applied to the inertia element;

a rod slidably inserted in the retainer hole; and a biasing member for biasing the rod toward the inertia element resting on the retainer hole;

said rod having a switch change-over portion and a free end portion, said switch change-over portion and free end portion being movable under the biasing force of the biasing member upon movement of the inertia element from the retainer hole to an upper wall of said plate-like member as a result of application of the predetermined acceleration so that said switch change-over portion changes over a switch and said free end portion closes the retainer hole.

When the inertia element jumps out onto the upper surface of the plate-like member from the retainer hole, the free end portion of the rod closes the retainer hole by the biasing force of the biasing member. At the same time, the switch is changed over in response to the movement of the rod.

In each of the above acceleration sensors according to this invention, the retainer hole is closed by the free end portion of the rod due to the biasing force of the biasing member when the inertia element has jumped out onto the upper wall of the plate-like member. Even if another acceleration is applied to the inertia element due to a secondary collision of the vehicle and the inertia element is about to rest on the retainer hole, the inertia element comes to contact with the free end portion of the rod and cannot rest on the retainer hole. The switch can, therefore, be maintained in the ON state.

Specific embodiments of the present invention will now be described by way of example and not by way of limitation with reference to the accompanying drawings.

DETAILED DESCRIPTION OF THE INVENTION AND PREFERRED EMBODIMENTS

The acceleration sensor according to the first embodiment will first be described with reference to FIGS. 1 through 8, in which numeral 1 indicates the acceleration sensor for detecting an acceleration upon collision of a vehicle.

Figure 1:
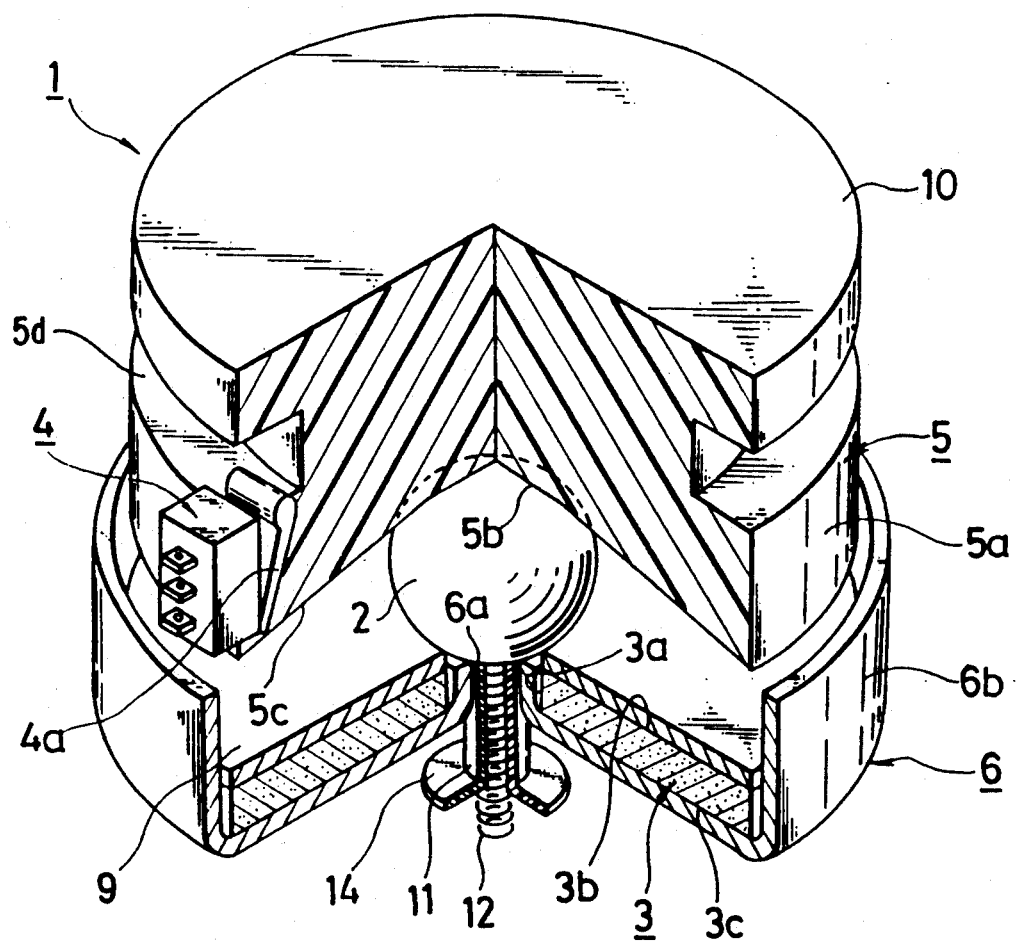
FIG. 1 is a partly cut-off, perspective view of an acceleration sensor according to a first embodiment of this invention.
Figure 2:
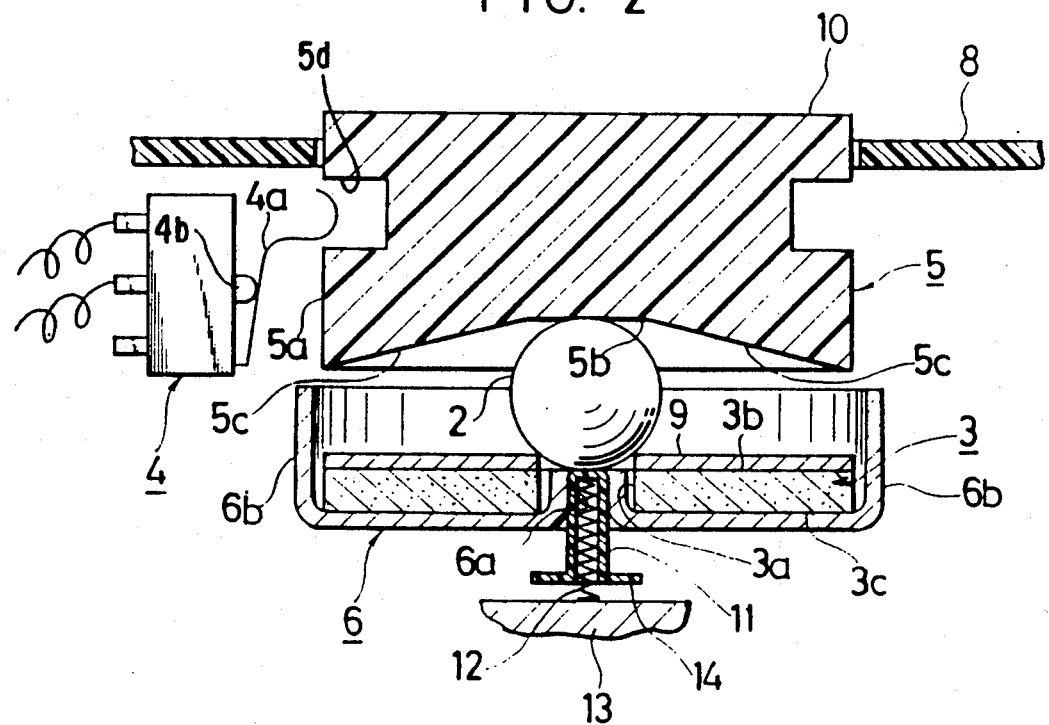
FIG. 2 is a vertical cross-sectional view of the acceleration sensor.
Figure 3:
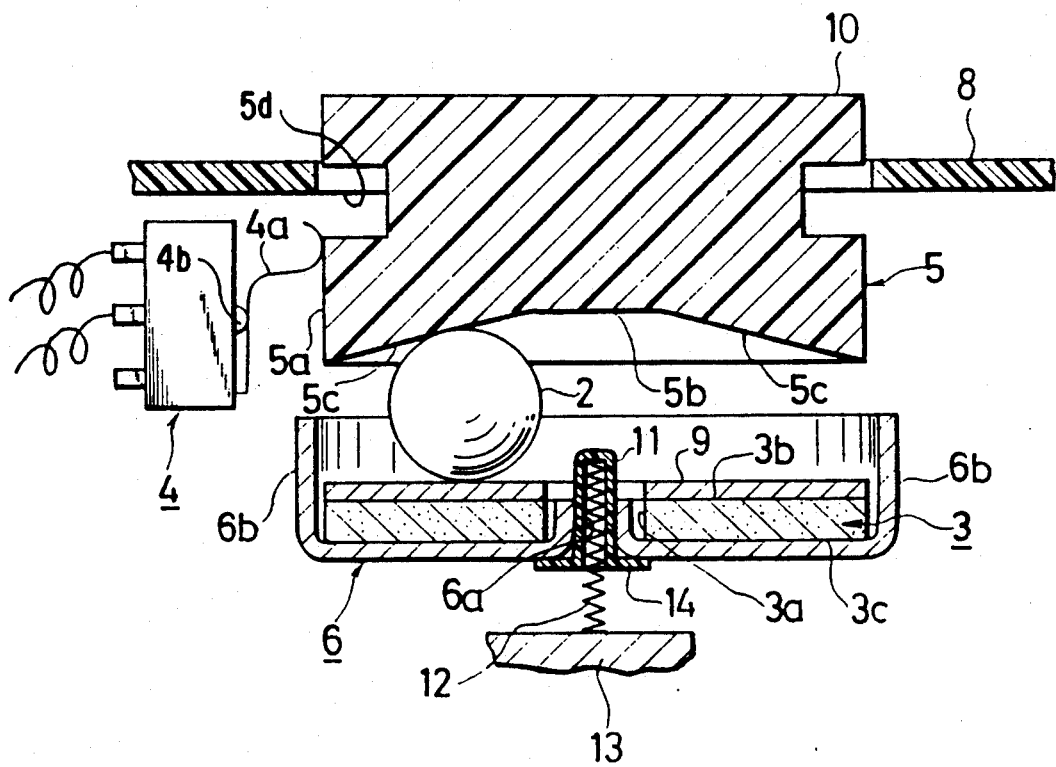
FIG. 3 is similar to FIG. 2 except that an inertia element has jumped out onto a magnet.

As is illustrated in FIGS. 1 and 2, the acceleration sensor 1 is constructed of a spherical inertia element 2 made of a magnetic material and having a predetermined mass, a magnet 3 as a plate-like member, said magnet 3 defining a retainer hole 3a on which the inertia element 2 is allowed to rest so that it is retained until a predetermined acceleration is applied thereto, a switch change-over member 5 for changing over a switch 4 in response to movement of the inertia element 2 from the retainer hole 3a onto an upper wall 3b of the magnet upon application of the predetermined acceleration, a magnetic member (e.g., steel plate) 6 having high permeability and attached to a lower wall 3c of the magnet 3, another magnetic member 9 attached to the upper wall 3b of the magnet 3, and a rod 11 slidably inserted in the retainer hole 3a.

The magnet 3 has an annular configuration and centrally defines the retainer hole 3a. The magnetic member 6 is the annular magnetic member attached on the whole area of the lower wall 3c of the annular magnet 3. An inner peripheral portion 6a of the magnetic member 6 is raised so that the inner peripheral portion 6a covers an inner peripheral wall of the retainer hole 3a, and an outer peripheral portion 6b of the magnetic member 6 is also raised whereby the outer peripheral portion 6b covers an outer peripheral wall of the annular magnet 3. Owing to the construction as described above, lines of magnetic force pass through the high-permeability magnetic member 6. As a consequence, lines of magnetic force are developed centering around the retainer hole 3a of the magnet 3 and also around an outer peripheral portion of the magnet 3 (see FIG. 5). Incidentally, the magnetic member (e.g., steel plate) 9 is provided to protect the upper wall 3b of the magnet 3 from sliding movement of the inertia element 2.

The switch change-over member 5 defines a peripheral groove 5d in which a free end portion of a lever actuator 4a of a switch 4 is received to maintain the switch 4 in an OFF position as log as the inertia element 2 remains on the retainer hole 3a. The switch change-over member 5 is constructed so that it moves upwards in response to movement of the inertia element 2 from the retainer hole 3a onto the magnetic member 9 arranged on the magnet 3 and, as a result of this movement, an outer peripheral wall 5a pushes a lever actuator 4a of a switch 4 so that the switch 4 is turned on via the plunger 4b. Further, a reset member 10 is provided in an upper part of the switch change-over member 5 in a form integral with the switch change-over member 5.

The reset member 10 and the change-over member 5 are disposed slidably up and down relative to a casing 8 and are biased downward by an unillustrated spring. Accordingly, a contact surface 5b of the change-over member 5 is normally maintained in contact with a top portion of the inertia element 2. The switch change-over member 5 also defines an inclined surface 5c, which serves to push the inertia element 2 toward the retainer hole 3a when the reset member 10 is depressed to lower the switch change-over member 5 in a state that the inertia element 2 lies on the magnetic member 9 arranged on the magnet 3 (the state shown in FIG. 3 or FIG. 4).

The switch 4 is changed over as described above upon detection of an acceleration at the time of a vehicular collision. The switch 4 can be used, for example, in the above-described passive seat belt system so that a signal can be outputted to an unillustrated control circuit to prevent the other end of the webbing from moving forward along the roof rail even when the door opens.

The rod 11 defines therein a hollow space, in which a coil spring 12 is inserted. One end of the coil spring 12 is secured to a vehicle body 13 or to an unillustrated casing mounted on the vehicle body 13. A flange 14 is integrally provided on a lower end portion of the rod 11. The biasing force of the coil spring 12 is less than the force by which the inertia element 2 is retained on the retainer hole 3a, so that the inertia element 2 is allowed to rest and is retained in the retainer hole 3a until the predetermined acceleration is applied (the state shown in FIG. 2).

Figure 8:
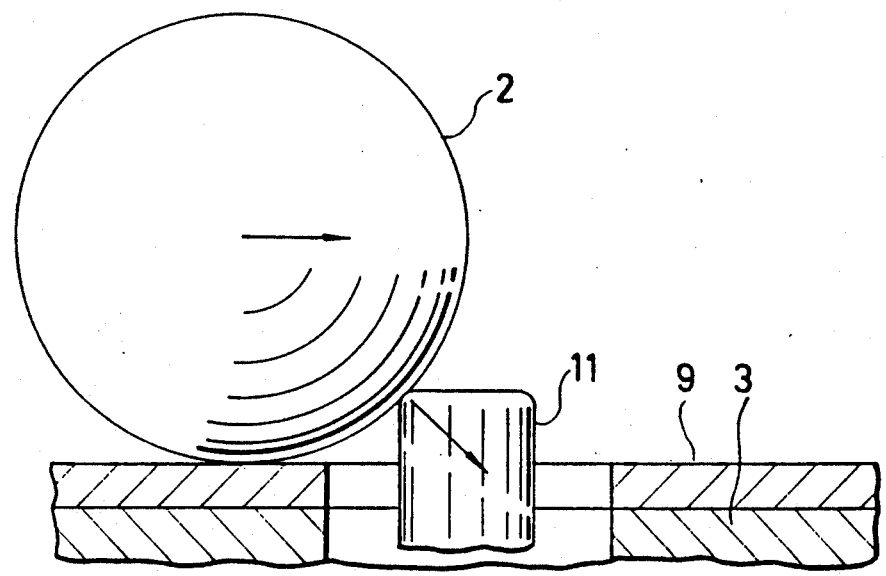
FIG. 8 is an enlarged fragmentary cross-sectional view of the acceleration sensor, showing the relationship between the inertia element and a free end portion of the rod when a reset member is depressed.

As soon as the inertia element 2 jumps out of the retainer hole 3a of the magnet 3, the rod 11 is pushed upward by the biasing force of the coil spring 12 and the free end portion thereof protrudes rom the, retainer hole 3a. When the flange 14 has come to contact with the magnetic member 6, the rod 11 cannot move further upward. The flange 14, therefore, determines the degree of protrusion of the rod 11. In the first embodiment, the degree of protrusion of the rod 11 is set in such a way that, as illustrated in FIG. 8, a depressant force can be exerted in a lower right direction on the free end portion of the rod 11 when the inertia element 2 is pushed back toward a longitudinal central axis of the retainer hole 3a.

Operation of the acceleration sensor according to the first embodiment and its advantages will be described hereinafter.

In a normal state, the inertia element 2 is retained resting on the retainer hole 3a, namely, at the prescribed position by the biasing force of the unillustrated spring, said biasing force being applied to the switch change-over member 5, gravity and the magnetic force of the magnet 3. Since lines of magnetic force are developed centering around the retainer hole 3a of the magnet 3 and large magnetic force is produced there as described above, the inertia element 2 can be retained by a large holding force at the prescribed position where the inertia element 2 rests on the retainer hole 3a. This increased holding force allows the detection of appreciably greater accelerations. Incidentally, the value of a detectable lowest acceleration is adjustable by changing the distance A of fall of the inertia element 2 in the retainer hole 3a (see FIG. 6), the magnetic force, the biasing force of the unillustrated spring and the biasing force of the coil spring 12.

When the predetermined acceleration is applied to the vehicle, the inertia element 2 jumps out of the retainer hole 3a of the magnet 3 onto the upper wall of the magnetic member 9 toward the outer peripheral portion thereof. At this time, the switch change-over member 5 is caused to move upward by the inertia element 2. This upward movement causes the outer peripheral wall 5a of the change-over member 5 to push the lever actuator 4a of the switch 4 so that the switch 4 is turned on via the plunger 4b (the state shown in FIG. 3). As described above (see FIG. 5), lines of magnetic force are developed centering around the outer peripheral portion of the magnet 3, thus producing there a substantial magnetic force. When the inertia element 2 has moved further from its position in FIG. 3 toward the outer peripheral portion of the magnet 3, the inertia element 2 is therefore attracted to the outer peripheral portion of the magnet 3 and is retained there by the large magnetic force (state shown in FIG. 4).

Since the magnetic force of the magnet 3 is used to hold the inertia element 2 at the position to which the inertia element 2 has moved from the predetermined position as a result of the application of the predetermined acceleration, it is possible to obviate any special holding mechanism or system so that the structure can be simplified.

Figure 7:
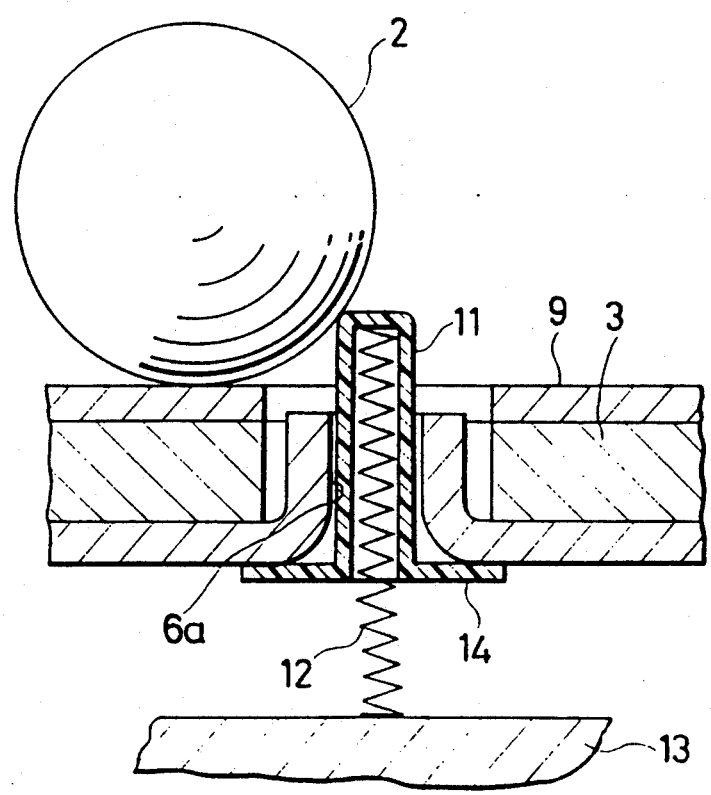
FIG. 7 is an enlarged fragmentary cross-sectional view of the acceleration sensor, depicting a rod in a protruded position.

Further, when the inertia element 2 jumps out of the retainer hole 3a of the magnet 3, the rod 11 is pushed upward by the biasing force of the coil spring 12 so that the free end portion of the rod 11 protrudes from the retainer hole 3a (the state shown in FIG. 7). As a result, even if a further acceleration is applied to the inertia element 2 in such a direction as moving the inertia element 2 toward the retainer hole 3a by a secondary collision or the like of the vehicle, the inertia element 2 comes into contact with the free end portion of the rod 11 and cannot rest in the retainer hole 3a. The inertia element 2, therefore, still lies on the upper wall of the magnetic member 9 and continues to push the switch change-over member 5 upward, whereby the switch 4 is maintained in the ON state.

Figure 4:
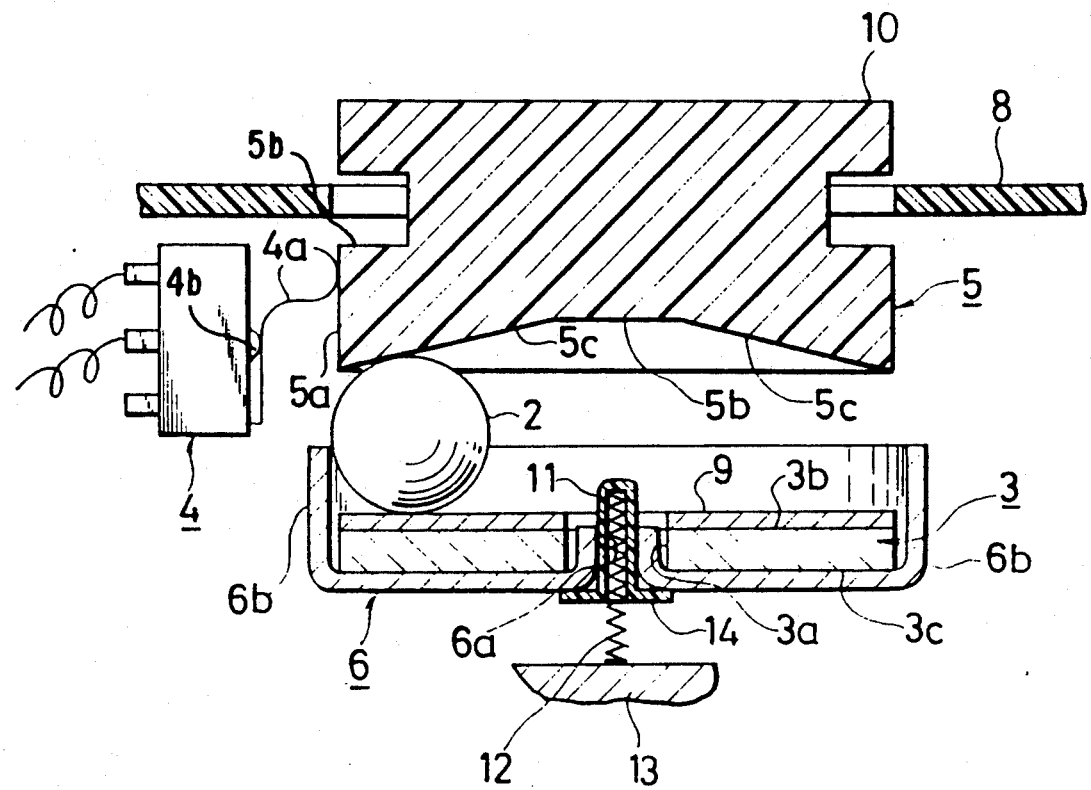
FIG. 4 is similar to FIGS. 2 and 3 except that the inertia element is retained on an end portion of the magnet.
Figure 5:
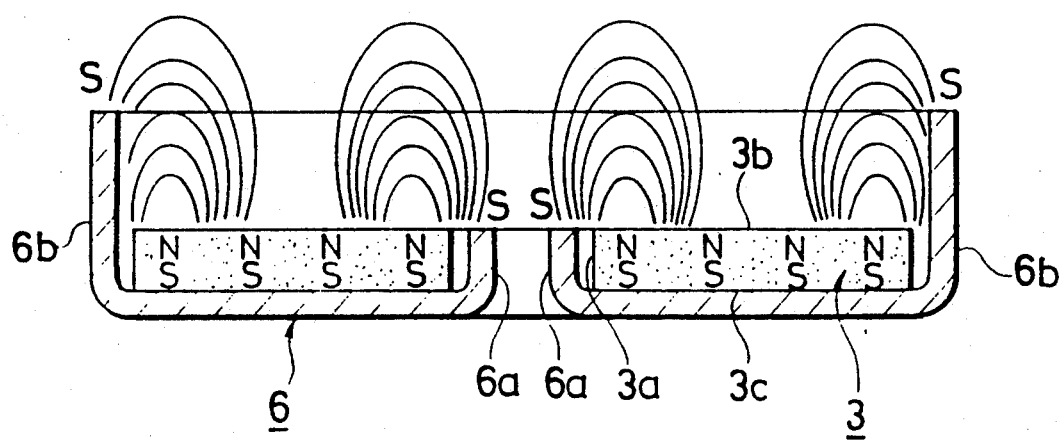
FIG. 5 is a schematic illustration of the acceleration sensor, showing lines of magnetic force developed.
Figure 6:
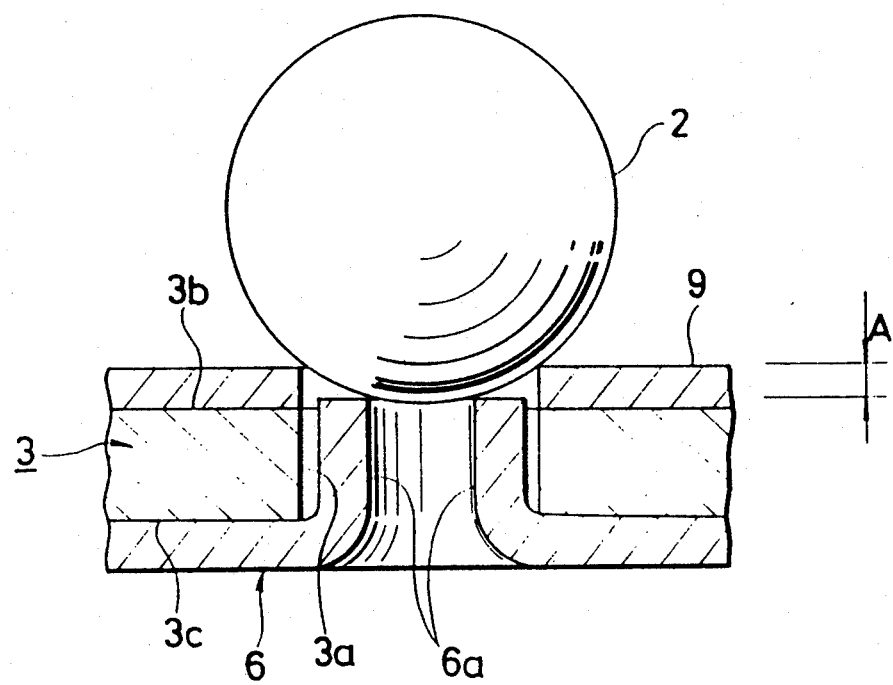
FIG. 6 is an enlarged fragmentary cross-sectional view of the acceleration sensor, illustrating the inertia element held on a retainer hole.

When the reset member 10 is depressed in the state where the inertia element 2 is in the position shown in FIG. 4, not only the reset member 10 but also the switch change-over member 5 are caused to move downward. The inertia element 2 is, therefore, guided on the upper wall of the magnetic member 9 by the inclined surface 5c of the change-over member 5 so that the inertia element 2 is brought into contact with the free end portion of the rod 11. When the reset member 10 is depressed further and force greater than inertia force, which may be produced by a secondary collision or the like, is exerted on the inertia element 2, the rod 11 is caused to move downward against the biasing force of the coil spring 12. When the inertia element 2 has moved onto the longitudinal central axis of the retainer hole 3a while pushing down the rod 11, the inertia element 2 is attracted by magnetic force to rest on the retainer hole 3a. At the same time, the free end of the lever actuator 4a is allowed to enter the peripheral groove 5d, whereby the switch 4 is turned off. Reset has now been completed.

Figure 9:
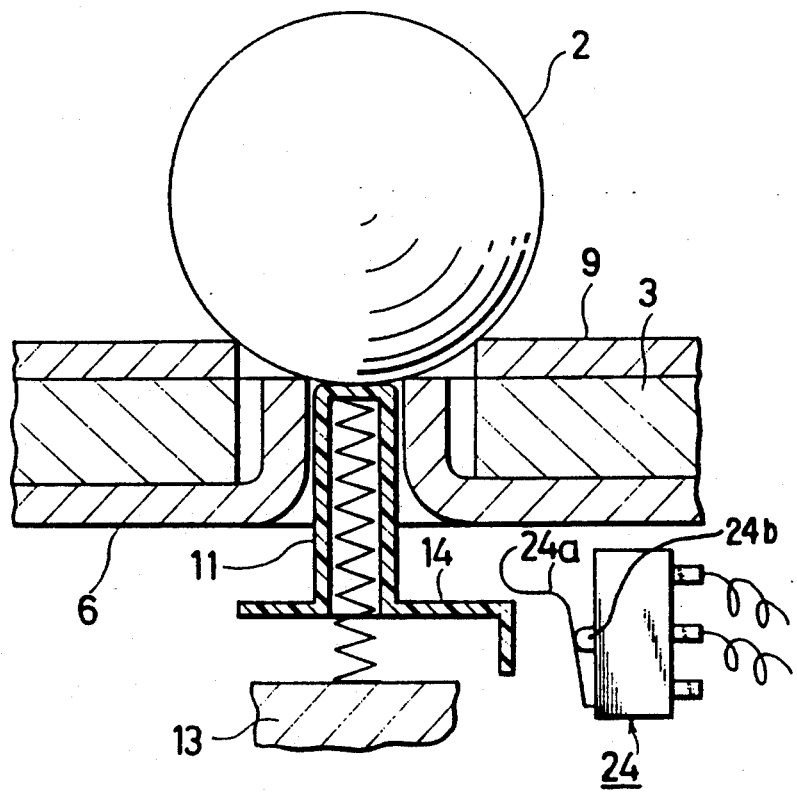
FIG. 9 is a fragmentary cross-sectional view of an acceleration sensor according to a second embodiment of this invention.

The acceleration sensor according to the second embodiment of this invention will next be described with reference to FIG. 9, in which elements of structure similar to the corresponding elements in the first embodiment are identified by like reference numerals and their description is omitted herein to avoid unnecessary repetition.

In the first embodiment described above, the switch 4 is changed over by the switch change-over member 5. As an alternative, the up and down movement of the rod can be used. As shown in FIG. 9, a switch 24 can be changed over via a plunger 24b by bringing the flange 14 of the rod 11 into contact with or out of contact from a lever actuator 24a of the switch 24 with the flange 14 of the rod 11.

In each of the first and second embodiments illustrated in the drawings, the free end portion of the rod 11 is designed to protrude from the retainer hole 3a. Since the rod 11 is required merely to prevent the inertia element 2 from being moved back onto the retainer hole 3a, it is possible to arrange the rod 11 such that the free end portion is allowed to move upward to substantially the same level as the upper wall of the magnetic member 9 and to close the retainer hole 3.

What is claimed is:

1. An acceleration sensor comprising:
   a spherical inertia element having a predetermined mass;
   a plate-like member defining a retainer hole on which the inertia element is allowed to rest and is retained until a predetermined acceleration is applied to the inertia element;
   a switch change-over member for changing over a switch in response to movement of the inertia element from the retainer hole to an upper wall of the plate-like member upon application of the predetermined acceleration;
   a rod slidably inserted in the retainer hole; and
   a biasing member for biasing the rod toward the inertia element resting on the retainer hole;
   whereby, when the inertia element has moved from the retainer hole to the upper wall of the plate-like member, the rod is caused to move under the biasing force of the biasing member and the retainer hole is closed by a free end portion of the rod.

2. The sensor of claim 1, wherein the plate-like member is composed of a magnet.

3. The sensor of claim 2, wherein the magnet has an annular configuration.

4. The sensor of claim 3, further comprising a magnetic member having high permeability and attached to a lower wall of the plate-like member.

5. The sensor of claim 4, wherein the magnetic member has an inner peripheral portion which is raised to cover an inner peripheral wall of the retainer hole of the plate-like member.

6. The sensor of claim 4, wherein the magnetic member has an outer peripheral portion which is raised to cover an outer peripheral wall of the plate-like member.

7. The sensor of claim 1, wherein the free end portion of the rod protrudes from the retainer hole when the inertia element has moved to the upper wall of the plate-like member.

8. The sensor of claim 6, wherein the outer peripheral portion extends upwardly so as to hold the inertial element within the sensor once the inertia element has been unseated from the retaining hole; and the sensor further comprises a reset member which, when operated, causes the inertia element to move from the upper wall of the plate-like member so that the inertial element rests on the retainer hole.

9. The sensor of claim 8, wherein the reset member is integral with the switch change-over member.

10. An acceleration sensor comprising:
a spherical inertia element having a predetermined mass;
a plate-like member defining a retainer hole on which the inertia element is allowed to rest and is retained until a predetermined acceleration is applied to the inertia element;
a rod slidably inserted in the retainer hole; and
a biasing member for biasing the rod toward the inertia element resting on the retainer hole;
said rod having a switch change-over portion and a free end portion, said switch change-over portion and free end portion being movable under the biasing force of the biasing member upon movement of the inertia element from the retainer hole to an upper wall of said plate-like member as a result of application of the predetermined acceleration so that said switch change-over portion changes over a switch and said free end portion closes the retainer hole.

11. The sensor of claim 10, wherein the plate-like member is composed of a magnet.

12. The sensor of claim 11, wherein the magnet has an annular configuration.

* * * * *